Figure 1:
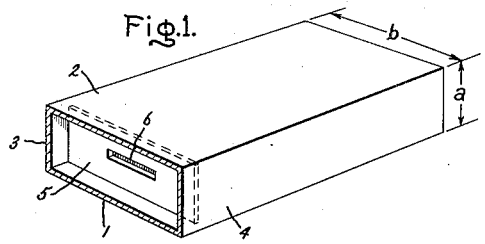

Sept. 11, 1951  M. D. FISKE  2,567,701
ULTRA HIGH FREQUENCY COUPLING DEVICE FOR WAVE GUIDES
Filed June 2, 1944  4 Sheets-Sheet 1

Inventor:
Milan D. Fiske,
by Harry E. Dunham
His Attorney.

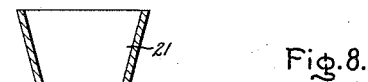
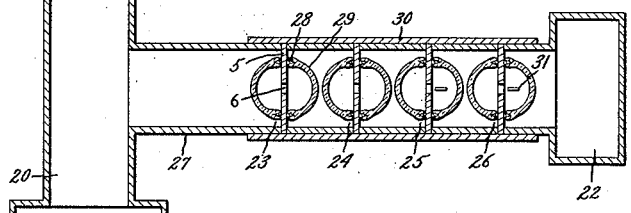
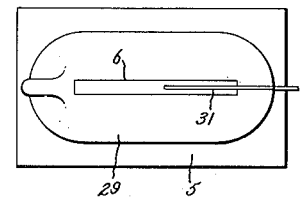
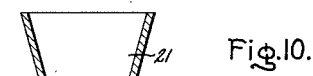
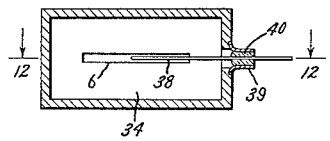
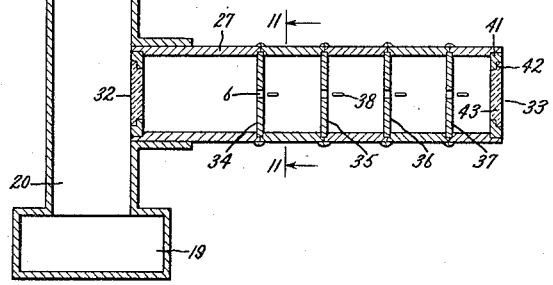
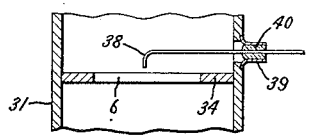
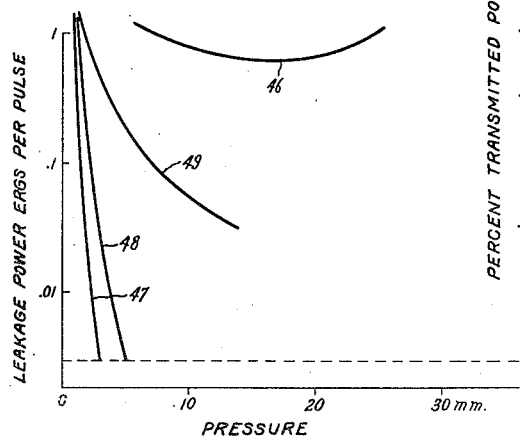
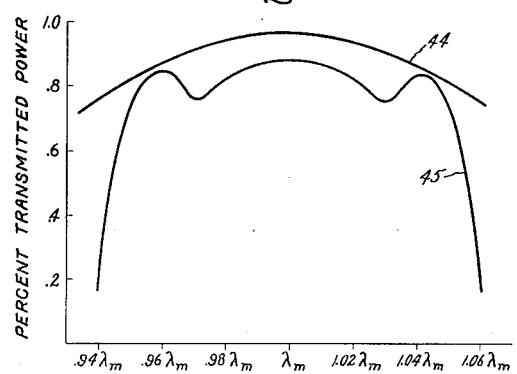

Inventor:
Milan D. Fiske,
by Harry E. Dunham
His Attorney.

Inventor:
Milan D. Fiske,
by Harry E. Dunham
His Attorney.

Patented Sept. 11, 1951

2,567,701

UNITED STATES PATENT OFFICE 2,567,701

ULTRA HIGH FREQUENCY COUPLING DEVICE FOR WAVE GUIDES

Milan D. Fiske, Schenectady, N. Y., assignor to General Electric Company, a corporation of New York Application June 2, 1944, Serial No. 538,483

5 Claims. (Cl. 178—44)

My invention relates to apparatus and method for coupling ultra high frequency systems and more particularly to apparatus and methods for selectively coupling or decoupling dielectric wave guides of the hollow pipe type, concentric or coaxial transmission lines, or interconnecting wave guides and coaxial transmission lines. It is an object of my invention to provide a new and improved coupling device for ultra high frequency systems.

It is another object of my invention to provide a new and improved coupling device for ultra high frequency systems which operates efficiently over a wide frequency range.

It is a further object of my invention to provide a new and improved protective device for receiver circuits in ultra high frequency apparatus having interconnected transmitter and receiver circuits.

It is a still further object of my invention to provide a new and improved coupling arrangement which affords improved transmission of ultra high frequency waves.

It is still another object of my invention to provide new and improved devices whereby the coupling effect between elements of an ultra high frequency system may be readily controlled.

It is a still further object of my invention to provide an improved coupling arrangement for ultra high frequency systems which may be tuned either electrically or mechanically at a rapid rate.

It is a further object of my invention to provide a new and improved coupling arrangement for radio directive and detective equipment in which jamming of the equipment is substantially prevented.

Briefly stated, in accordance with a general aspect of my invention I provide new and improved apparatus and methods for coupling elements or parts of high frequency systems, such as systems designed for the utilization of ultra high frequency electromagnetic waves or microwaves. A plurality of localized regions of charged electrical particles are employed as decoupling elements or electrodes, the density of the particles being controlled to establish or control the coupling between elements or parts of the high frequency system. The regions of charged electrical particles are displaced longitudinally in the direction of propagation of electromagnetic waves in the system and prepulsing of the discharge regions by application of a high intensity voltage pulse of relatively short duration to the elements slightly in advance of an incident radio frequency pulse is utilized to obtain high attenuation of unwanted waves. Control of the prepulsing units permits more efficient transmission of unwanted waves through spaced regions. In one modification of the invention, a plurality of discharge regions are individually sealed to operate under different pressure and pulsing conditions.

In still another form apertures, across which the charged electrical particles pass, are given a different configuration and for the prepulsing voltages there is substituted a continuous unidirectional voltage to maintain a continuous discharge across the apertures to provide ionization conditions favorable for operation of the coupling units for incident radio frequency voltages of low value.

In another aspect, the invention includes the use, in conjunction with a plurality of spaced regions of controlled electrical particles, of a filter unit to permit passage of only a single frequency. When used in an ultra high frequency system for radio direction and detection, not only is substantially complete attenuation of unwanted signals obtained, but passage of the single frequency used in the equipment itself is assured and attempts at jamming by the sending of a plurality of frequencies roughly equal to the single frequency used in the equipment are frustrated. In still another aspect of this system, the filter, the frequency of transmitted waves, and the local oscillator used in the receiver equipment are tuned either mechanically or electrically at a high rate to permit wobbulating or variation of the frequency of the equipment over a substantial range.

In accordance with a still further feature of my invention, the regions of charged electrical particles may be of peculiar configurations to accomplish the above-described coupling effects while minimizing reflections of electromagnetic waves due to interconnection of the system parts. For example, the region of charged particles may extend longitudinally of the path of propagation and, hence, the effective dielectric constant and the phase separation of longitudinally spaced points in the path may be controlled by the density of the charged particles.

Figure 2:
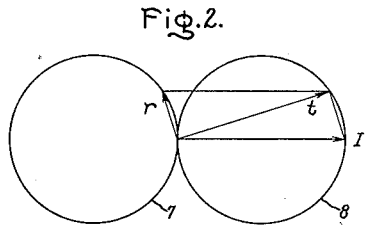
Figure 3:
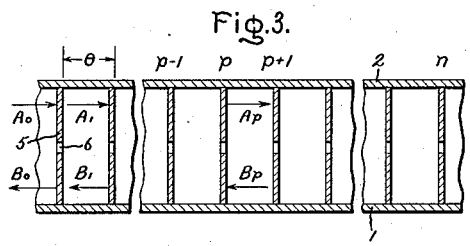
Figure 27:
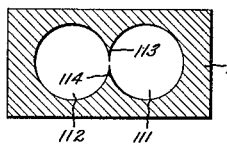
Figure 22:
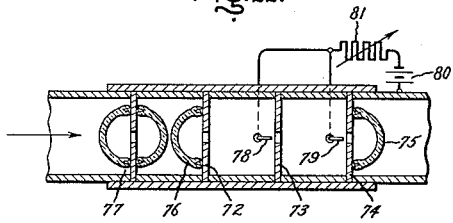
Figure 23:
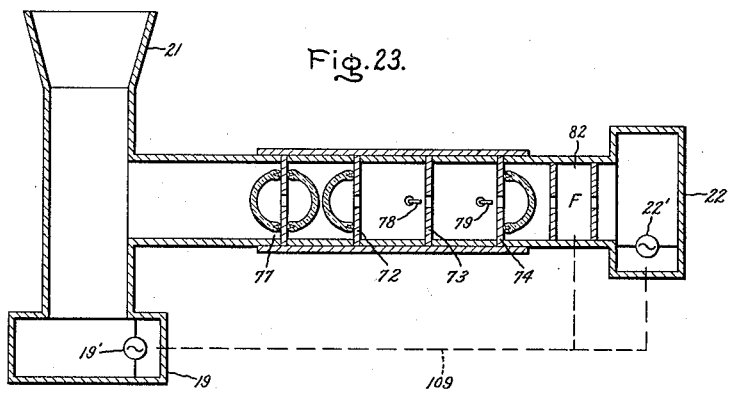
Figure 24:
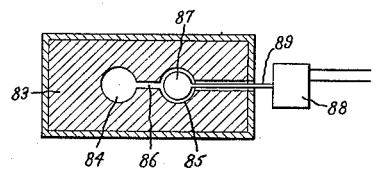
Figure 26:
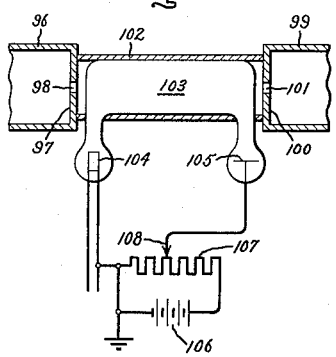
Figure 25:
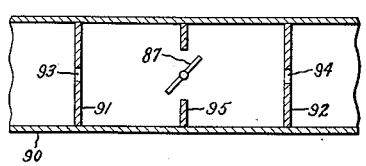

For a better understanding of my invention, reference may be had to the following description taken in connection with the accompanying drawings, and its scope will be pointed out in the appended claims. Fig. 1 illustrates certain features of the wave guide structure and decoupling elements employed in my invention;

Fig. 2 is a vector diagram used for explaining certain underlying theoretical considerations of the invention; Fig. 3 is a longitudinal cross section of a wave guide utilizing a plurality of electric discharge paths; Figs. 4–7 are curves showing reflection characteristics of the multiple resonant slot constructions shown in Fig. 3; Fig. 8 is a longitudinal cross-sectional view of a multiple element coupling device embodying the invention; Fig. 9 is an enlarged view of one of the enclosed resonant slots shown in Fig. 8; Fig. 10 illustrates a modified form of the multiple element coupling arrangement of my invention; Figs. 11 and 12 are front and plan views, respectively, of the resonant slot construction used in the apparatus of Fig. 10; Figs. 13–21 are curves illustrating certain operating characteristics of the multiple element coupling arrangement of Fig. 10; Fig. 22 represents still another modification of the multiple element coupling arrangement in which auxiliary electrode means are employed to maintain an electric discharge of the elements; Fig. 23 illustrates a still further modification in which a filter unit is employed with a multiple element coupling arrangement to prevent jamming in radio direction and detection arrangements; Figs. 24–26 illustrate various mechanically and electrically controlled filter units which may be employed in the system of Fig. 23; and Fig. 27 illustrates a modification of the decoupling elements employed in the systems of my invention.

Referring now to the accompanying drawings, Fig. 1 illustrates a hollow pipe type wave guide wherein electromagnetic waves are transmitted or propagated dielectrically. It is appreciated that the transverse dimensions of the hollow pipe may be of a variety of configurations and, for the purposes of illustrating the invention, I have chosen to represent a pipe having a substantially rectangular cross section. The guide may comprise metallic enclosing walls constructed of a conductive material, such as copper or brass, and may include a base plate 1, a top plate 2, and side walls 3, 4, all of which are conductively connected. The dimensions $a$ and $b$, the depth and height of the guide, the dielectric constant of the medium within the guide, and the wave pattern determine principally the critical or cut-off frequency of the guide. The dielectric medium through which the electromagnetic energy is transmitted may be considered as being air or gas. Of course, the waves may also be satisfactorily transmitted through an evacuated space.

The wave guide is provided with a wall element, such as a metallic plate 5, the plane of which is substantially perpendicular to the longitudinal axis of the guide and which may be soldered or welded to the inner surfaces of the walls of the guide. The plate 5 may be constructed of copper or silver and is, of course, conductive. As is disclosed and claimed in my joint U. S. Letters Patent 2,407,068, granted September 3, 1946, and assigned to the assignee of the present invention, in order to concentrate the potential at the wall 5 incident to the electromagnetic field which is propagated thereto, there is provided in the wall 5 a resonant or tuned aperture, such as a slot 6, which may be of rectangular form having its principal dimension parallel to the base plate 1 of the guide. The slot 6 effects a concentration of the field intensity or potential incident to the electromagnetic field across the horizontal edges of the slot. The slot 6 is tuned to the frequency of the electromagnetic waves propagated along the wave guide so that it causes little reflection of electromagnetic waves of this frequency.

The principal dimension of the slot is perpendicular to the electric component of the electromagnetic wave which is transmitted through the guide. If, for example, a $TE_{01}$ type electromagnetic wave is transmitted along the axis of the guide, the electric component of the field is perpendicular to the base of the guide.

The metallic wall 5 is a thin wall, so that the slot 6 has a very small phase extension along the wave guide. It is well known that the reflection properties of such elements having very small phase extension along the wave guide are very nearly those of simple circuits shunted across a transmission line. Resonant slots, such as the slot 6, may be represented by a parallel resonant circuit shunted across a transmission line. When the wall 5 is of copper or brass, the resistive components of that parallel circuit usually may be neglected, as they are in the following discussion of the vector diagram shown in Fig. 2.

The loci of the reflection and transmission coefficients $r$ and $t$ of all such parallel resonant circuits of the type of the resonant slot 6 are circles 7 and 8 of unit diameter when drawn in the complex plane with amplitudes as functions of phase. I represents the incident voltage of amplitude unity and zero phase. The following vector relations hold for lossless parallel resonant circuits:

$$r - t = -1$$
$$r + t = e^{-i2\varphi}$$
$$r = j \sin \varphi e^{i\varphi}$$
$$t = \cos \varphi e^{i\varphi} \qquad (1)$$
$$\tan \varphi = Q\left(\frac{\omega}{\omega_0} - \frac{\omega_0}{\omega}\right)$$
$$(j = \sqrt{-1})$$

where $\varphi$ is the angle between the incident and transmitted voltage waves. In the above equations, Q is defined as $$Q = \frac{\omega_0}{\Delta \omega}$$

where $\Delta \omega$ is the frequency difference between points of half-power reflection or transmission and $\omega_0$ is the resonant frequency. It is also the "energy Q" if the resonant circuit is considered as shunted by the characteristic guide impedance in either direction.

In Fig. 3 there is shown a wave guide similar to the wave guide of Fig. 1 in which a plurality of transverse walls are connected to the conductive outer walls of the guide and in which each of the transverse walls is provided with a resonant slot 6. The transverse walls 5 are separated longitudinally by equal phase distances $\theta$ along the uniform transmission line with a matched load (not shown) connected across the guide at its right-hand end. The series of transverse walls comprises $n$ identical elements having reflection and transmission coefficients $r$ and $t$, respectively. If a wave of amplitude $A_0$ is incident from the left, multiple reflections are built up between the elements 5, in general adding up to a wave of amplitude A, traveling from the source, and one of amplitude B traveling toward the source. If each wave is measured at the right-hand side of its respective element, then for the wave between the $p^{th}$ and the $(p+1)^{th}$ elements:

$$A_p = A_{p-1} t e^{-i\theta} + B_p r \qquad (2)$$
$$B_p = B_{p+1} t e^{-i\theta} + A_p r e^{-2i\theta} \qquad (3)$$

From (2)

$$B_{p+1} = -\frac{t}{r}e^{-i\theta}A_p + \frac{1}{r}A_{p+1} \quad (4)$$

These yield $$A_{p+1} + \frac{1}{t}[(r^2-t^2)e^{-i\theta} - e^{i\theta}]A_p + A_{p-1} = 0 \quad (5)$$

Using relations (1) this becomes $$A_{p+1} - \frac{2\cos(\theta+\varphi)}{\cos\varphi}A_p + A_{p-1} = 0 \quad (6)$$

A complete set of solutions of this difference equation is afforded by $$A_p = Me^{p\alpha} + Ne^{-p\alpha} \quad (7)$$

where $$\alpha = \cosh^{-1}\frac{\cos(\theta+\varphi)}{\cos\varphi} \quad (8)$$

The boundary conditions on (7) are that $$A_0 = M+N \quad \text{and} \quad A_n = A_{n-1}te^{-i\theta} \quad (9)$$

We may then obtain $$T_n = \frac{A_n}{A_0} = \frac{\sinh\alpha}{e^{i(\theta+\varphi)}\sec\varphi\sinh n\alpha - \sinh(n-1)\alpha} \quad (10)$$

For quarter-wave spacings $$\theta = \frac{\pi}{2}$$

and (8) is reduced to $$\cosh\alpha = \tan\varphi \quad (11)$$

For two elements $|T|=1$ occurs only at $\omega_0$; for three, $|T|=1$ at $\omega_0$ and at $$\omega = \omega_0\left(1 \pm \frac{1}{4Q}\right)$$

For four element, $|T|=1$ at $\omega_0$ and at $$\simeq \omega_0\left(1 \pm \frac{\sqrt{2}}{4Q}\right)$$

It has been observed that these theoretical relationships relate very closely with those found by actual measurement and that, in general, when $n$ has an even value there are $n-1$ points of $|T|=1$. For $n$, odd, there are $n$ such points.

A $Q_n$ for $n$ elements may be defined as a $Q$ for a single circuit having the same half-power band width as the $n$ elements, rather than the conventional definition of $Q_n$ as being related to energies of a circuit. This value of $Q_n$ is obtained from Equation 10 by setting $$|T| = \frac{\sqrt{2}}{2}$$

and expanding the right-hand side as a polynominal in tan Q. Then it may be shown that $$Q_n = \frac{1}{\tan\varphi'}Q_1$$

where $Q_1$ is the Q of a single element and tan $\varphi'$ is a real root of $$|T|_n = \frac{\sqrt{2}}{2}$$

One obtains $Q_2 = \sqrt{2}\,Q_1$; $Q_3 = 1.31\,Q_1$ and $Q_4 = 1.21\,Q_1$, the subscripts of Q denoting the number of elements.

Figure 4:
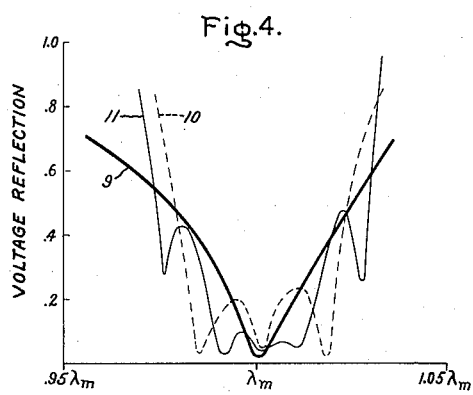

In Fig. 4, curve 9 shows actual voltage reflection measurements of one resonant slot as the wavelength of the incident electromagnetic waves is varied from $m$, the mid-band free-space wavelength to which the slot is tuned; curve 10, of three resonant slots; and curve 11 of five resonant slots at quarter-wave separation for $Q_1=10$. In these curves, reflection coefficients are used rather than transmission coefficients, because of the greater ease of measurement of reflected voltages. From this group of curves it is apparent that a loss in each element becomes noticeable at $n=5$ where all of the minima points do not touch the zero reflection axis.

Figure 5:
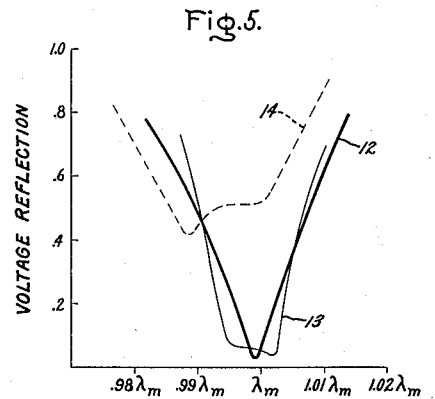

In Fig. 5, curve 12 shows the reflection of a single slot with $Q_1=35$ which is tuned exactly to the frequency of the incident electromagnetic waves. Curve 13 shows the reflection from two slots spaced apart by a distance $$\frac{\lambda gm}{d}$$

where $\lambda$ gm is the mid-band guide wavelength, the individual slots being tuned to the frequency of the incident electromagnetic wave. Curve 14 shows reflection from the same two slots as curve 13, but where the frequency at which the slot is tuned is reduced by one per cent from the frequency of the incident electromagnetic wave. This group of curves shows that for the particular slots employed an error $\Delta\omega$ in tuning of the order of one per cent of the incident wave resulted in serious and objectionable reflection.

Figure 6:
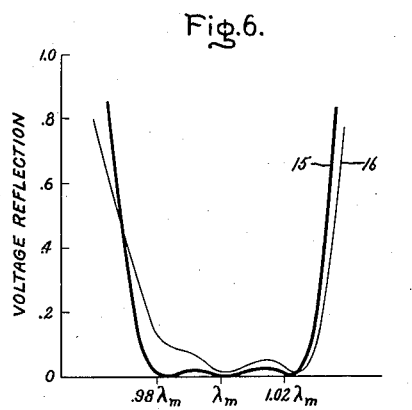

Referring to Fig. 6, a reflection is shown from resonant slots which are tuned exactly to the frequency of the incident electromagnetic wave, but in which the phase distance between individual slots varies from the desired value of $$\frac{\lambda gm}{4}$$

In this figure, curve 15 shows the reflection from three resonant slots where the spacings between slots are equal and are equal to $$\frac{\lambda gm}{4}$$

while the curve 16 likewise shows the reflection from three tuned slots where the spacing between the end slots is equal to $$\frac{\lambda gm}{2}$$

while the ratio of the spacings between the first and second and the second and third slots is equal to approximately 0.72. In contrast with the curves of Fig. 6, those of Fig. 7 show the reflection from three resonant slots where the spacings between successive slots are equal, but these values differ from $$\frac{\lambda gm}{4}$$

In curve 17 the spacing between successive slots is $$\frac{\lambda gm}{4}$$

while in curve 18 the spacing is increased to $$\frac{1.57\lambda_{gm}}{4}$$

Figure 7:
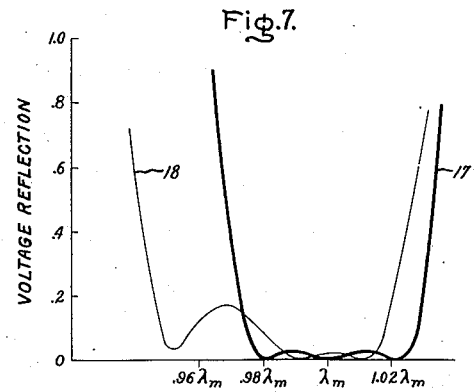

Considering the curves of Figs. 6 and 7 jointly, therefore, it is apparent that small errors in spacing are not important for a three-slot arrangement, whereas, as is evident from the curves of Fig. 5, a slight error in tuning of any one slot of the individual slots results in serious reflection even though spacing between the slots is equally dimensioned. It follows that, while $$\frac{\lambda_{gm}}{4}$$

is optimum spacing between elements, spacings other than $$\frac{\lambda_{gm}}{4}$$

may purposely be employed to obtain increased band width, as is evidenced by curve 18, especially in equipment where slightly greater voltage reflections are permissible.

It can be shown that, if each resonant element is grossly mistuned either by changing $\omega$ or by altering its structure, $a$ of Equation 8 becomes very large and in the limit the detuned $T_n$ becomes $$T_{nd} = 2\left(\frac{t_d}{2j}\right)^n \qquad (12)$$

where $t_d$ is the voltage transmission of a single detuned element. Thus, it is apparent that the voltage attenuation per element is doubled by proper spacing and the total attenuation is the product of the attenuations of the individual elements.

Referring now to Fig. 8, there is shown a multiple-element coupling unit for an ultra high frequency system which may be used for example for radio detection and direction purposes. In this figure, the transmitter 19 is connected to a dielectric wave guide 20 which is terminated at its upper end in a flared horn or radiating element 21. The receiver 22 is likewise connected to wave guide 20 through a coupling unit which comprises a plurality of elements 23–26 having tuned or resonant slots and which are spaced apart in the branch wave guide structure 27 by a distance equal to a quarter wavelength at the operating frequency of the system and the element 23 is spaced from wave guide 20 by a distance equal to $$\frac{\lambda_{gm}}{2}$$

Each of the elements 23–26 comprises a transverse wall structure 5 having a resonant slot 6. Connected to opposite sides of each of the elements 23–26 at positions intermediate the slot 6 and the walls of wave guide 27 are metallic sleeves 28 and sealed across these metallic sleeves on opposite sides of the slot 6 are glass seals 29. Preferably, the members 29 are formed of a boro-silicate glass and the metallic members 28 are formed of an iron-nickel-cobalt alloy having a coefficient of expansion which matches that of the boro-silicate glass. Each of the individual members 23–26 may be placed between adjacent portions of the wave guide 27 cut to the exact length of a quarter wavelength and the whole structure may be held in place by rectangular sleeve 30 sealed to the outer surface of the wave guide 27. Each of the members 23–26 forms a structure which is shown in enlarged elevation view in Fig. 9. The region within the glass seals 29 is filled with gas and the resonant slot structures 25, 26 may include a prepulsing electrode 31 which is sealed into the glass member 29 and lies in a plane parallel with the slot 6, being spaced away from the slot by a distance great enough that the tuning of the slot is not disturbed. The inner edges of the prepulsing electrodes are bent inwardly toward the slot to localize the discharge in the center of the slots 6.

In the operation of the system of Fig. 8, the glass seals 29 are designed and positioned relative to the transverse walls 5 so that the reflection from the slot 6 effectively cancels the reflection from the dielectric seals, or vice versa, depending upon the direction of wave propagation through the guide 27. Thus, when low intensity signals received from space by the antenna or horn 21 are transmitted over wave guide 27 to the receiver 22, the multiple-element coupling unit comprising the members 23–26 forms a transmission means having a wide band pass characteristic and which in the presence of the low intensity signals thus received transmits these signals to the receiver substantially without reflection, the tuned slots 6 providing reflectionless transmission of the incident electromagnetic energy and the spacing between the seals 29 and the slot 6 being such that reflections due to the presence of these seals are substantially cancelled. When a high intensity electromagnetic wave from the transmitter 19 is propagated along wave guide 20 to be radiated by antenna 21 and travels along branch wave guide 27 to the coupling units 23–26, the resonant slots of these units, being tuned substantially to the frequency of the incident electromagnetic waves, effect a breakdown of the surrounding atmosphere within the sealed regions. The presence of the electric discharge across the slot in unit 23, for example, varies the effective dielectric constant of the dielectric medium through which the electromagnetic waves are propagated thereby changing the wave guide from a propagator to an attenuator of the electromagnetic waves. Since the electron density in the electric discharge across the gap 6 approaches that available in metal wall 5, almost complete reflection of the incident wave is effected by the unit 23. The presence of the additional units 24–26 further increases the amount of attenuation of the incident electromagnetic wave so that the multiple elements provide more complete attenuation of the wave of the transmitter and more effective protection of the apparatus of the receiver 22. Since the wave from transmitter 19 which reaches elements 25, 26 is of insufficient intensity to initiate an electric discharge across the respective tuned slots of these elements, these slots are prepulsed by means of a high intensity voltage pulse of relatively short duration applied to electrodes 31 slightly in advance of the pulse of radio frequency wave, i. e., 0.1 microsecond for example. The optimum prepulse timing and voltage depends in general upon the gas surrounding the resonant slots of the elements 25, 26, the repetition rate of the transmitter voltage pulse, and the configuration of the electrodes 31. The desired condition is to have an electric discharge across the slots of elements 25, 26 which has a density as great or greater than that of the electric particles in the slots of elements 23, 24 produced by the radio frequency wave alone.

The structure of Fig. 8 has the advantage that the pressure and kind of gas within each of the coupling units 23–26 may be adjusted for each of the gaps or resonant slots. Thus, the seal around gap 23 may contain gas at a relatively high pressure to localize the discharge at the slot and not over the glass envelope surface, while the pressure within the remaining coupling units 24–26 may be adjusted to afford optimum protection of the receiver 22 from high intensity signals from the transmitter 19.

In the form of the invention shown in Fig. 10, the main body of the coupling unit is formed by a section of wave guide tubing 27 closed at either end by reflectionless windows 32, 33. The resonant slot structures or elements 34–37 are soldered in position within the tube 27, each of the structures 34-37 being similar to the wall 5 containing the slot 6 shown in Fig. 1. The individual slot structures are shown in detail in Figs. 11 and 12, the former figure being an elevation view of one of the resonant slot structures, for example the coupling unit 34, taken along the lines 11—11 of Fig. 10, and Fig. 12 being a plan view of the structure shown in Fig. 11. Prepulsing electrodes 38 are brought into the wave guide 31 through a quarter wave choke and seal which comprises a tubular sleeve 39, soldered to the wall of the guide 31 and concentrically surrounding the electrode 38, being separated therefrom by a dielectric seal 40. The length of the sleeve 39 is made equal to a quarter wavelength at the frequency of the electromagnetic waves being propagated along the wave guide 31, so that the seal 39 not only maintains a desired gas pressure within the wave guide section, but also prevents the leakage of electromagnetic energy along the electrodes 38.

The reflectionless windows 32, 33 are of a form described and claimed in my U. S. Letters Patent 2,422,189, granted June 17, 1947, and assigned to the assignee of the present invention. These windows comprise a transverse metallic wall 41, preferably of an iron-nickel-cobalt alloy sealed to the walls of the wave guide 27 and provided with a central aperture having a recessed shoulder 42 across which is hermetically sealed a glass window 43 formed of boro-silicate glass. The opening sealed by glass member 43 is in the form of a resonant slot, the dimensions of the slot being greater than those of the slots 6 in the coupling members 34-37. The voltage or potential difference appearing between the upper and lower edges of the openings in the end walls 32, 33 is affected by the resonant characteristics of the slot and the magnitude of this voltage difference increases as the magnitude of the exciting waves, i. e., the waves passing along the wave guide 31, increases. The dielectric window 43 breaks down when the magnitude of these waves reaches a predetermined value, the voltage difference being sufficient to cause ionization of the gas on the interior surfaces of the windows and an electric discharge takes place across the windows. The walls 41 and the glass members 43 are made sufficiently thin that they have very small phase extension along the guide and, hence, can be made reflectionless and of very low Q, the Q being determined by the height of the opening in the plates 41. Thus, for example, in a window resonant at 10 centimeters having a glass plate one inch high, the Q is about 1, whereas a window having a glass plate about one-quarter inch high has a Q of about 2.5. The windows, when broken down, act as a constant voltage source for incident electromagnetic energy up to very large values of the order of a megawatt or more.

From practical considerations, the window 32 is chosen to have as small a height as is consistent with band width considerations to increase the concentration of the electromagnetic waves so that a discharge may more readily take place across the window. In the entire coupling unit comprising the wave guide 31, the windows 32, 33 and the transverse walls 34-37, the wall 34 is shown as spaced from the window 32 by a distance equal to $$\frac{\lambda_{gm}}{2}$$

although the value of this spacing is not a critical one. The elements 34-37 are spaced apart by a distance equal to $$\frac{\lambda_{gm}}{4}$$

and the window 33 is spaced from transverse wall 37 by a distance $$\frac{\lambda_{gm}}{4}$$

Of course, an extension of the wave guide 31 may be connected beyond the window 33 to connect a receiver (not shown) in the same manner as the receiver 22 is connected to the wave guide 27 in Fig. 8.

The curves of Fig. 13 show the transmission characteristics of the coupling unit of Fig. 10 as compared with the transmission characteristic of a single resonant slot. Curve 44 shows the transmitted power for a single resonant slot as the frequency of the incident electromagnetic wave is varied over a substantial band width. Curve 45 shows the power transmitted through a wave guide employing four resonant elements mounted in the manner of the elements 34-37 shown in Fig. 10 and employing the end windows 32, 33 and illustrates that the level of transmission is maintained substantially equal to that of a single resonant slot over a considerable band width, although the composite structure is characterized by definite band pass characteristics, not present to as great a degree in the case of a single resonant slot.

Figure 15:
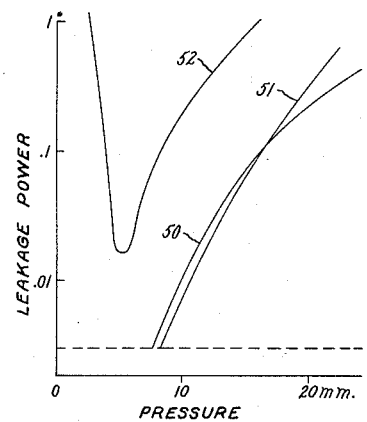

Fig. 14 illustrates the power leakage characteristics through the coupling unit of Fig. 10 for different prepulsing voltages and the number of slots fired by such voltages as a function of gas pressure within the sealed wave guide section 31. Curve 46 illustrates the leakage power when the units 34, 35, 36 are prepulsed by a voltage V showing that the leakage power was of substantial value throughout a considerable range of gas pressures. In contrast, curve 47 illustrates the leakage power when the same electrodes are prepulsed with a voltage of 2 v. Curves 48 and 49, respectively, denote the leakage energy when elements 35, 36 and element 36 are prepulsed by a voltage of 2 v. For all of these measurements, the electromagnetic energy in main guide 20 consisted of one micro-second pulses having a repetition rate of 1000 cycles per second and a peak power level of about 35 kilowatts. The characteristics of different types of gases within the seal of the wave guide section 31 may be illustrated by comparing the curves of Fig. 14 obtained when argon is used as the gas within the wave guide with the curves of Fig. 15 when the gas-filled medium comprised nitrogen, and with the curves of Fig. 16 obtained when the coupling unit was filled with hydrogen. In Fig. 15, curve 50 was obtained with prepulsing of elements 34, 35, 36; curve 51, with prepulsing of elements 35, 36; and curve 52, with prepulsing of element 36 alone, the prepulsing voltage used in all cases being 2 v. The same prepulsing arrangement was used in obtaining curves 53, 54, 55 of Fig. 16. The additional curve 56 in Fig. 16 was obtained and denotes the leakage power under the conditions which prevailed when the curve 55 was obtained, with the exception that 5 millimeters of water vapor were added to the hydrogen gas within the sealed region.

Figure 16:
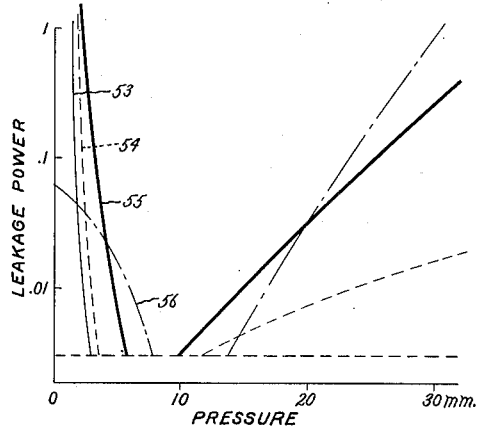

From a study of the curves of Figs. 14-16, certain general conclusions are obtained, among which is that hydrogen as a gas filling for a coupling device of the type described gives distinctly better protection, i. e., less power flows through the coupling device, than nitrogen and somewhat better protection than argon. Another factor of considerable importance is that an increase of the order of 20 db. in attenuation is obtained by prepulsing slots 35 and 36 over slot 36 alone. An additional gain of approximately 5 db. is obtained when prepulsing of slot 34 is included. The most important consideration is the fact that voltage of the prepulse is an important factor and doubling of the voltage of the prepulse increases the attenuation in the order of 25 db.

Figure 17:
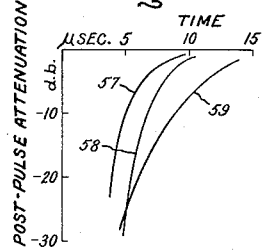
Figure 18:
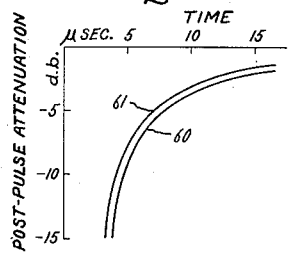

Fig. 17 illustrates the recovery time of the multiple element coupling device of Fig. 10 as a function of the prepulsing voltages and the number of prepulsing electrodes employed. The term "recovery time" as used in this connection may be defined as the time required, after removal of prepulsing potentials, for sufficient deionization of the gaseous medium to take place to permit passage through the coupling devices of low level signals received by antenna 21. Of course, this time of recovery should be a small part of the total time between pulses. In Fig. 17, curve 57 illustrates the recovery time when a prepulsing voltage of V was used on the electrode connected with the slot 36 and curve 58, when the same voltage was used in prepulsing the members 35 and 36. The curve 59 illustrates the increase in the recovery time when the prepulsing voltage potential applied to the electrodes for the slots of members 35 and 36 was increased to 3 v. That the addition of water vapor to the gaseous medium has but a small effect upon the recovery time is apparent from curves 60 and 61 of Fig. 18, where the former represents the recovery time when the wave guide section was filled with hydrogen of a certain pressure and the latter represents the recovery time when a small amount of water vapor was included in the gaseous mixture within the wave guide section.

Figure 19:
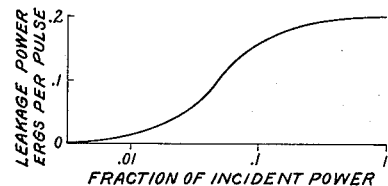
Figure 20:
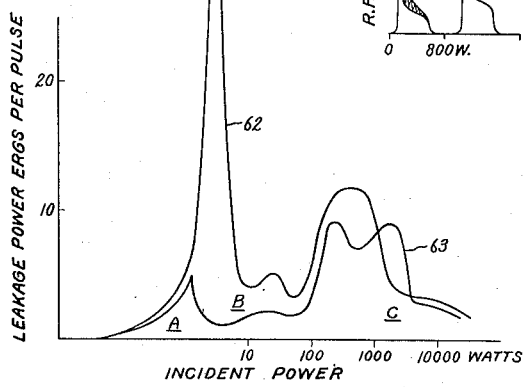

Fig. 19 illustrates the relation between leakage power versus incident power for the gas-filled switch of Fig. 10 and shows that, as the electromagnetic energy incident on the window 32 of the wave guide section is decreased, the prepulsing electrodes and voltage conditions remaining the same, the leakage power decreases monotonically. In contrast with the curve of Fig. 19, the curves of Fig. 20 show that, if power is incident on the gas-filled coupling unit which is out of phase with the prepulsing voltage or if there is no prepulsing voltage, the leakage power varies considerably. In this figure, curve 62 illustrates the leakage power when no prepulsing voltage is used to maintain gaseous discharge across the various resonant slots within the switching device. Curve 63, on the other hand, shows the power leakage which occurs when the maximum current flow across the slots of members 35 and 36 is maintained, by application of auxiliary voltage to electrodes 38, which is permissible without noticeable attenuation of low level electromagnetic energy whose transmission is desired. It is apparent from a comparison of curves 62 and 63 that a greater leakage of power occurs when the electrodes supply no ionization to the slot region. Several distinct regions in the levels of incident power are noticeable in the curves of Fig. 20. Thus, for very small amounts of power in the main wave guide 20, that is the region A of curves 62, 63, the amplitude of the incident electromagnetic energy is too small to increase the ionization across the individual resonant slots. If the incident power is increased, however, the first peak of curve 62 in region B indicates that a condition occurs where the amplitude of the incident electromagnetic wave is too small to cause a breakdown of the resonant slot elements 34-37 when no ionization is present across the slots, that is, when there is no prepulsing of these particular resonant gaps. Finally, as the power is increased, a condition occurs where a discharge takes place across the entrance window 32 of the gaseous switch. This point is denoted on curves 62 and 63 by the dropping off of these curves at their right-hand edges in region C.

Figure 21:
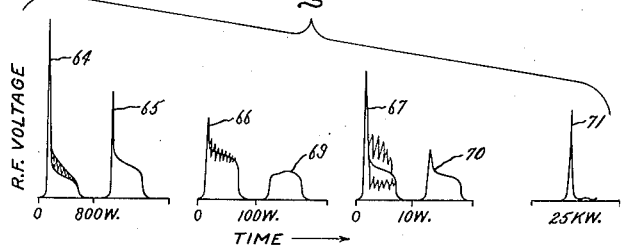

The curves of Fig. 21 illustrate to a greater extent the two conditions discussed in the previous paragraph. Curves 64 and 65 denote, respectively, the envelope of the radio frequency power which passes through the four-element gaseous switch when no prepulsing voltage is used and when a steady gaseous discharge is maintained across the resonant gap of element 35 by external means. In the remaining curves of this figure, a steady gaseous discharge was maintained across the gaps of elements 35 and 36 by external means, while the incident power was varied. Curves 66 and 67 show the radio frequency power envelopes obtained when no prepulse is used and curves 69, 70, 71 show the envelopes when the same respective incident power is used and the gaseous discharge is maintained by external means. A noticeable feature of all these curves is that, when the gaseous discharge is not maintained across one or more of the elements of the switch, the maximum power loss is two or more times as great as that which occurs when the discharge is maintained. Furthermore, no very large peak occurs in the leakage power when the discharge is maintained, except for incident powers of 10 kilowatts or more. In summary of the foregoing discussion of the operation of the gaseous coupling device of Fig. 10, it is seen that this coupling unit has a wide band pass characteristic and that the leakage power, even for high incident powers, is relatively small when one or more of the component elements is prepulsed, but that the leakage power may be of considerable magnitude when no prepulsing is used. The recovery time of the individual elements is determined largely by the amount of prepulse and, while it depends upon the gaseous medium used, is relatively unchanged by the addition of water vapor to that medium.

Fig. 22 shows another modification of the multiple element coupling unit of my invention in which three resonant gap structures 72, 73, 74 are sealed by means of windows 75, 76 constructed similar to the windows shown in Fig. 8 to provide a sealed region in which the gas pressure across the resonant gaps is maintained at one value and an additional resonant element 77 is sealed separately by means of similar windows and maintained at a different pressure, the element 77 being positioned in the path of the incident power ahead of the elements 72—74. Electrodes for maintaining a continuous discharge are used in conjunction with the gaps of elements 73, 74, the electrodes 78, 79 being maintained at a positive potential with respect to the transverse walls of elements 73, 74 by means of a battery 80 connected between the wave guide structure and these electrodes through a variable resistance 81. Preferably the electrodes 78, 19 provide a continuous unidirectional discharge across the associated gaps to maintain ionization conditions favorable for operation of the decoupling devices for low incident radio frequency voltages on elements 73, 74.

When employed in a radio directive and detection system, the gaseous discharge switching arrangement shown in the previously described modification is open to the objection that the proper functioning of the system may be interrupted or jammed by the sending to the receiving apparatus of the system a signal which consists of two frequencies equal approximately to that used by the transmitter of the system, but having a frequency difference equal to that of the intermediate frequency employed in the receiver circuits of the system. Fig. 23 shows apparatus in which such interruption may be forestalled. In the system illustrated in this figure and in which component parts which are similar to those previously described are identified by like reference numerals, a filter 82 is interposed between the receiver 22 and the gaseous discharge switch or coupling unit which is illustrated as being the same as that shown in Fig. 22. This filter preferably is a frequency responsive or high Q unit and permits the passage only of the single frequency being propagated by the transmitter 19. A distinct advantage of this system is that the filter 82 may be tuned either mechanically or electrically at a high rate and may be mechanically linked for gang operation with the ultra high frequency source used in the transmitter 19 and with the local oscillator used in the receiver 22 to give the proper intermediate frequency. Certain structural features of such filter elements are claimed in applicant's co-pending divisional application, Serial No. 97,277, filed June 4, 1949.

Fig. 24 illustrates one form of a mechanically tuned filter which is particularly adapted for such a system. This filter comprises a transverse metallic wall 83 connected across the wave guide and provided with a plurality of parallel openings 84, 85 connected by a horizontal slot 86 to form a resonant dumb-bell shaped opening in the wall. A metallic member 87 of substantially paddle shape may extend into the circular opening 85 and may be positioned by means of an externally mounted motor 88 and a drive shaft 89. It will be appreciated that, as the position of the paddle 87 is changed, the effective dimensions of the opening 85 are also changed thereby adjusting or controlling the frequency to which the aperture comprising the parallel openings 84, 85 and the connecting slot 86 is resonant. The motor 88 may be, for example, a portion of a meter movement used in conjunction with the transmitting apparatus to vary the frequency of the transmitted wave. The paddle-like member 87 may be used alone in a single transverse wall or may be used in a resonant cavity in the manner illustrated in Fig. 25. In this figure, which shows a section of a wave guide 90, the transverse walls 91, 92 are provided with longitudinal openings 93, 94 which are non-resonant in character and provide reflection of the incident electromagnet waves so that the space between the walls 91, 92 acts as a cavity resonator. The frequency of resonance of this cavity resonator is determined by the position of the paddle 87 with respect to a resonant slot in an intermediate wall 95. It is apparent that, when this structure is used as a filter unit in the system illustrated in Fig. 23, the frequency of the electromagnetic wave transmitted through the coupling units there illustrated is a function of the position of the paddle 87.

Fig. 26 illustrates another form of filter unit having a high Q which may be employed in connection with the system of Fig. 23. In the portion of the system there illustrated, the left-hand wave guide section 96, which may contain a coupling unit of the type illustrated in either Figs. 8, 10, or 22, is terminated by a transverse wall 97 having a non-resonant aperture 98. A wave guide section 99 connected to receiver circuits (not shown) likewise is terminated in a transverse wall 100 having a non-resonant aperture 101. The sections 96, 99 are connected through an intermediate wave guide section 102 in which is disposed a gaseous discharge device 103 comprising a gas-filled sealed envelope containing a cathode 104 and an anode 105. A discharge may be set up between the anode and cathode by any suitable excitation means, one form of which is illustrated in Fig. 26 as a battery 106 across which is connected a resistor 107. The cathode 104 is connected to the negative terminal of the resistor and anode 105 is connected to a variable point on potentiometer 107 by means of a slider 108. It is apparent that, as the slider 108 is varied on the resistance 107, the magnitude of the electric discharge in tube 103 is varied and, hence, the dielectric constant of wave guide section 102 and the phase separation of the apertures 98, 101 are varied.

The underlying considerations of the operations of the filters illustrated in Figs. 24–26 are similar in that a cavity resonator formed in a wave guide structure by a pair of transverse metallic walls having reflective apertures therein and spaced apart longitudinally of the wave guide is provided with means for adjusting the phase separation of the pair of transverse walls and, hence, the magnitude of the reflected wave. In a mechanically operated type, the resonance frequency of a slot traversed by electro-magnetic waves between the transverse metallic walls is varied so that, for waves of a particular frequency, the phase separation varies from a value where a wave reflected from 94 is not in phase opposition to a wave reflected from opening 93, for example, to effect cancellation of the reflected waves, to a condition where such phase opposition occurs and cancellation of the reflected waves is provided. In the type of filter shown in Fig. 26, in contrast, the phase separation is obtained by changing the dielectric constant of the medium through which the waves travel, the electrical phase separation of the openings 98, 101 being a function of the dielectric constant of the medium between these openings.

The foregoing considerations are of use in the construction of a system of the type illustrated in Fig. 23 in which the transmitter 19 includes a source of high frequency oscillations 19' and the receiver 22 includes a source of local oscillations 22' for mixing with the received high frequency oscillations to produce waves of intermediate frequency. Interruption or jamming of the proper operation of the system, by the sending to the system of two high frequencies equal approximately to the frequency of the oscillations of transmitter 19 but having a difference equal to that of the intermediate frequency of the receiver 22, is prevented by the use of the frequency responsive filter 82 which is highly selective and tuned to the exact frequency of the transmitter 19. Preferably, the oscillator 19' of the transmitter 19 and the local oscillator 22' of the receiver 22, as well as the filter 82, are variable in frequency and are linked by any suitable means, such as mechanical linkage 109 for gang operation, so that the frequency of the transmitter 19, the tuned frequency of the filter 82, and the frequency of the local oscillator in the receiver 22 are varied in unison over a definite frequency range. The wide frequency band of the coupling system comprising the multiple elements 72, 73, 74, 77 permits tuning of the system over the above-mentioned frequency range without requiring simultaneous tuning of the coupling elements. As a result wobulation or variation of the frequency of the transmitter by as much as 15 per cent is permitted in such a system.

In the construction of a radio directive and detective system employing a filter of this type, it is of course obvious that the filter must be placed between the receiver circuits and the decoupling units employed, this requirement being necessary because the power of the transmitter when operative is sufficient to produce intense ionization lasting an appreciable fraction of a pulsing period and, unless the high level incident energy from the transmitter is attenuated by the decoupling units of the type previously described, not only may serious injury to the discharge tube 103 occur, but proper reception of reflected waves may be prevented.

While in the foregoing the resonant apertures employed in the decoupling elements have been described and illustrated as rectangular slots in the transverse metallic wall member, it is apparent that other types of resonant apertures may be employed and, from certain considerations in particular applications, the use of other types of resonant slots may be preferable. One type of resonant aperture found particularly well suited for utilization in the multiple element systems illustrated in Figs. 8, 10, and 23 is shown in Fig. 27 and comprises a metallic wall member 110 having a pair of circular openings 111, 112. The metallic member 110 forms a pair of opposed points 113, 114 which define a gap connecting the openings 111, 112. In use, the wall member 110 is placed across a wave guide in a transverse plane after the fashion of the elements 23-26 in Fig. 8, for example. The dimensions of the gap formed between the points 113, 114 are correlated with the total area of the wall 110 to form an aperture which is resonant at the mid band frequency of the electromagnetic waves propagated along a wave guide including such an element. In operation, the points 113, 114 form a gap which, when sealed in a gaseous medium as described previously, functions as means for effecting a concentration of the potential of electromagnetic waves propagated therethrough and breaks down upon the incidence of electromagnetic waves of relatively low energy level to produce current flow across the resonant aperture and in the metallic member 110. When such resonant aperture is employed in a system of the type of Fig. 23, for example, the use of prepulsing electrodes is no longer required, since the breakdown point of the gap may be adjusted for a value of electromagnetic waves slightly in excess of the power level of radio frequency waves received by antenna 21. Of course, it is apparent that prepulsing electrodes may be employed with such a resonant structure and the use of such an electrode may be desirable. In particular with the latter elements of a multiple element decoupling device employing resonant apertures of this configuration it is desirable to maintain a continuous unidirectional discharge for the reasons outlined in connection with the system of Fig. 22.

From the foregoing, it is seen that my invention provides a new and improved multiple-element gaseous discharge coupling device which provides almost reflectionless transmission of incident electromagnetic energy over a wide frequency band, while permitting rapid attenuation of such energy above a certain energy level. While, in the foregoing description of the invention, the wave guide sections have been pointed out as being rectangular in cross section, it is apparent that my multiple-element coupling unit may be employed likewise in cylindrical guides and the underlying principles thereof may be employed in high frequency coaxial transmission lines of the concentric conductor type, the structures of the invention being used as breakdown elements to provide attenuation of energy above a certain level.

While I have shown and described my invention as applied to particular systems embodying various devices diagrammatically shown, it will be obvious to those skilled in the art that changes of the various systems and elements may be made without departing from my invention, and I therefore aim in the appended claims to cover all such changes and modifications as fall within the true spirit and scope of my invention.

What I claim as new and desire to secure by Letters Patent of the United States is:

1. In combination, a hollow pipe type wave guide for transmitting electromagnetic waves dielectrically, and means for attenuating waves in said guide having an intensity greater than a predetermined intensity, said means comprising a plurality of transverse wall members connected across said guide at points spaced apart longitudinally by a distance equal to an odd multiple of a quarter wave length at the frequency of said waves, each of said wall members having an aperture therein tuned to the frequency of said waves, and means associated with the end ones of said wall members for sealing the region between said wall members, said region being filled with a gaseous medium, and electrode means associated with at least one of said apertures for establishing an electric discharge in the vicinity of said one aperture.

2. In combination, a hollow pipe type wave guide for transmitting electromagnetic waves dielectrically, exciting means for establishing electromagnetic waves in said guide, at least three transverse wall members associated with said guide, the outer of said wall members being spaced longitudinally of said guide from the intermediate wall member by distances equal to an odd multiple of a quarter wave length at the frequency of said waves, each of said wall members being provided with an aperture tuned to the frequency of said waves, sealing means for establishing a gas-filled region around at least two of said apertures remote from said exciting means, and electrode means associated with said two apertures for establishing an electric discharge thereacross.

3. In combination, a hollow pipe type wave guide for transmitting electromagnetic waves dielectrically, exciting means for establishing electromagnetic waves in said guide, and at least three radiative wall members positioned relative to said guide in planes perpendicular to the direction of propagation of the electromagnetic waves through said guide, said wall members being spaced apart longitudinally of said guide by a distance equal to a quarter wave length at the frequency of said waves, said guide having the same cross-sectional dimensions and impedance on both sides of said wall members, each of said wall members being provided with an elongated aperture the principal dimension of which is perpendicular to the electric component of the electromagnetic waves, said aperture being tuned to the frequency of said exciting means, sealing means connected across the apertures in the end ones of said wall members to maintain the apertures in said end wall members at a pressure different from that in the remainder of said guide, and electrode means associated with the one of said apertures remote from said exciting means for establishing an electric discharge in the vicinity of said one aperture.

4. In combination, a hollow pipe type wave guide for transmitting electromagnetic waves dielectrically, exciting means for establishing electromagnetic waves in said guide, means including at least three transverse wall members connected across said guide, each of said wall members being provided with an aperture tuned to the frequency of said exciting means, said wall members being spaced apart longitudinally of said guide by a distance equal to an odd multiple of a quarter wave length at the frequency of said waves, sealing means connected across the end ones of said apertures for establishing between the end ones of said wall members a gas-filled region having a pressure different from that of the remainder of the guide, and electrode means associated with the two of said apertures remote from said exciting means for establishing gaseous discharges in the vicinity of said two apertures.

5. In combination, a hollow pipe type wave guide for transmitting electromagnetic waves dielectrically, exciting means for establishing electromagnetic waves in said guide, means including at least three transverse wall members associated with said guide, each of said wall members being provided with an aperture tuned to the frequency of said exciting means and said wall members being spaced apart longitudinally of said guide by a distance equal to an odd multiple of a quarter wave length at the frequency of said waves, sealing means connected across the end ones of said wall members for establishing a gas-filled region between said end wall members, electrode means associated with the aperture of said wall member remote from said exciting means for establishing an electric discharge in the vicinity of the aperture of said last-mentioned transverse wall member, said electrode means comprising a metallic rod passing through a side wall of said wave guide, and choke means associated with said metallic rod.

MILAN D. FISKE.

REFERENCES CITED

The following references are of record in the file of this patent:

UNITED STATES PATENTS

| Number | Name | Date |
|---|---|---|
| 2,235,010 | Chaffee | Mar. 18, 1941 |
| 2,356,414 | Linder | Aug. 22, 1944 |
| 2,396,044 | Fox | Mar. 5, 1946 |
| 2,402,184 | Samuel | June 18, 1946 |
| 2,403,302 | Richmond | July 2, 1946 |
| 2,403,303 | Richmond | July 2, 1946 |
| 2,407,068 | Fiske et al. | Sept. 3, 1946 |
| 2,412,446 | De Walt | Dec. 10, 1946 |
| 2,413,171 | Clifford | Dec. 24, 1946 |
| 2,413,963 | Fiske et al. | Jan. 7, 1947 |
| 2,415,242 | Hershberger | Feb. 4, 1947 |
| 2,432,093 | Fox | Dec. 9, 1947 |

FOREIGN PATENTS

| Number | Country | Date |
|---|---|---|
| 114,102 | Australia | Nov. 6, 1941 |